US012617699B2

(12) United States Patent
Besli et al.

(10) Patent No.: US 12,617,699 B2
(45) Date of Patent: May 5, 2026

(54) WATER SOFTENING INTERCALATION SYSTEMS

(71) Applicant: Robert Bosch GmbH, Stuttgart (DE)

(72) Inventors: Münir M. Besli, San Jose, CA (US); Saravanan Kuppan, San Jose, CA (US); Sondra Hellstrom, East Palo Alto, CA (US); Jake Christensen, Elk Grove, CA (US)

(73) Assignee: Robert Bosch GmbH, Stuttgart (DE)

( * ) Notice: Subject to any disclaimer, the term of this patent is extended or adjusted under 35 U.S.C. 154(b) by 1285 days.

(21) Appl. No.: 17/405,274

(22) Filed: Aug. 18, 2021

(65) Prior Publication Data

US 2023/0059547 A1 Feb. 23, 2023

(51) Int. Cl.
| | |
|---|---|
| *C02F 1/469* | (2023.01) |
| *B01D 61/48* | (2006.01) |
| *B01D 61/54* | (2006.01) |
| *C02F 1/461* | (2023.01) |
| *C02F 103/08* | (2006.01) |

(52) U.S. Cl.
CPC .......... *C02F 1/4695* (2013.01); *B01D 61/485* (2013.01); *B01D 61/54* (2013.01); *C02F 2001/46138* (2013.01); *C02F 2103/08* (2013.01); *C02F 2201/46115* (2013.01)

(58) Field of Classification Search
CPC .......... C02F 1/4695; C02F 2001/46138; C02F 2103/08; C02F 2201/46115; C02F 2001/46133; C02F 2001/46161; C02F 2301/08; C02F 1/4602; C02F 1/46114;

C02F 1/4691; B01D 61/485; B01D 61/54; B01D 2325/42; B01D 61/428; B01D 61/4281; B01D 69/02
See application file for complete search history.

(56) References Cited

U.S. PATENT DOCUMENTS

| | | | |
|---|---|---|---|
| 10,988,391 B2 | 4/2021 | Kim et al. | |
| 2015/0274555 A1 | 10/2015 | Volkel et al. | |
| 2018/0148355 A1* | 5/2018 | Smith .................. | B01D 61/463 |
| 2020/0123027 A1 | 4/2020 | Kornbluth et al. | |

(Continued)

FOREIGN PATENT DOCUMENTS

KR 20210083570 A 7/2021

OTHER PUBLICATIONS

"Rocking Chair Desalination Battery Based on Prussian Blue Electrodes" by Lee et al., ACS Omega 2017, 2, pages 1653-1659.*

(Continued)

*Primary Examiner* — Bryan D. Ripa
(74) *Attorney, Agent, or Firm* — Brooks Kushman P.C.

(57) ABSTRACT

A device for removing ions from a solution. The device includes first and second intercalation hosts, an anion exchange membrane, a first compartment extending between the first intercalation host and the anion exchange membrane, and a second compartment extending between the second intercalation host and the anion exchange membrane. The first and/or second intercalation hosts include a mixture of first and second intercalation materials. The first and/or second intercalation hosts may include layers (e.g., alternating layers) of the first and second intercalation materials. The first and second intercalation materials are different.

19 Claims, 6 Drawing Sheets

(56)     References Cited

U.S. PATENT DOCUMENTS

| | | |
|---|---|---|
| 2020/0123028 A1 | 4/2020 | Kim et al. |
| 2020/0123029 A1 | 4/2020 | Kornbluth et al. |
| 2020/0131058 A1 | 4/2020 | Kim et al. |
| 2020/0148560 A1 | 5/2020 | Hellstrom et al. |
| 2020/0207646 A1* | 7/2020 | Kim ..................... C02F 1/4604 |
| 2020/0399149 A1 | 12/2020 | Kim et al. |
| 2021/0039970 A1 | 2/2021 | Metzger et al. |
| 2021/0198124 A1 | 7/2021 | Metzger et al. |

OTHER PUBLICATIONS

"Removal of $Na^{+-}$ and $Ca2^+$ with Prussian Blue Analogue Electrodes for Brackish Water Desalination" by Sebti et al., Desalination 487 (2020) 114479.*

Sebti, E. et al., "Removal of $Na^+$ and $Ca2^+$ with Prussian blue analogue electrodes for brackish water desalination," Desalination, vol. 487, No. 114479, May 6, 2020, pp. 1-12, DOI: 10.1016/j.desal.2020.114479.

International Search Report issued in PCT/EP2022/072644, dated Nov. 16, 2022, 5 pages.

* cited by examiner

WATER SOFTENING INTERCALATION SYSTEMS

TECHNICAL FIELD

The present disclosure relates to water softening intercalation systems, for instance, intercalative water desalination (IDI) systems.

SUMMARY

According to one embodiment, a system for removing ions from a solution is disclosed. The system includes an upstream device including first and second upstream intercalation hosts and an upstream anion exchange membrane. The upstream device includes a first upstream compartment extending between the first upstream intercalation host and the upstream anion exchange membrane. The upstream device includes a second upstream compartment extending between the second upstream intercalation host and the upstream anion exchange membrane. The first and/or second upstream intercalation hosts include a first intercalation material configured to predominately intercalate a first type of cations from a solution flowing through the first and/or second upstream compartments, respectively. The downstream device includes first and second downstream intercalation hosts and a downstream anion exchange membrane. The downstream device includes a first downstream compartment extending between the first downstream intercalation host and the downstream anion exchange membrane. The downstream device includes a second downstream compartment extending between the second downstream intercalation host and the downstream anion exchange membrane. The first and/or second downstream intercalation hosts include a second intercalation material configured to predominately intercalate a second type of cations from the solution flowing through the first and/or second downstream compartments, respectively. The first and second types of cations are different.

According to another embodiment, a device for removing ions from a solution is disclosed. The device includes first and second intercalation hosts, an anion exchange membrane, a first compartment extending between the first intercalation host and the anion exchange membrane, and a second compartment extending between the second intercalation host and the anion exchange membrane. The first intercalation host includes a first surface adjacent to the first compartment and a second surface opposing the first surface. The second intercalation host includes a first surface adjacent to the second compartment and a second surface opposing the first surface. A number of layers extend between the first and second surfaces of the first and/or second intercalation hosts. At least one of the number of layers is formed of at least a portion of a first intercalation material. At least another of the number of layers is formed of at least a portion of a second intercalation material. The first and second intercalation materials are different. In one or more embodiments, the first or second intercalation material has a first or second intercalation material concentration gradient.

According to yet another embodiment, a device for removing ions from a solution is disclosed. The device includes first and second intercalation hosts, an anion exchange membrane, a first compartment extending between the first intercalation host and the anion exchange membrane, and a second compartment extending between the second intercalation host and the anion exchange membrane.

The first and/or second intercalation hosts include a mixture of first and second intercalation materials. The first and second intercalation materials are different.

DETAILED DESCRIPTION

Figure 1:
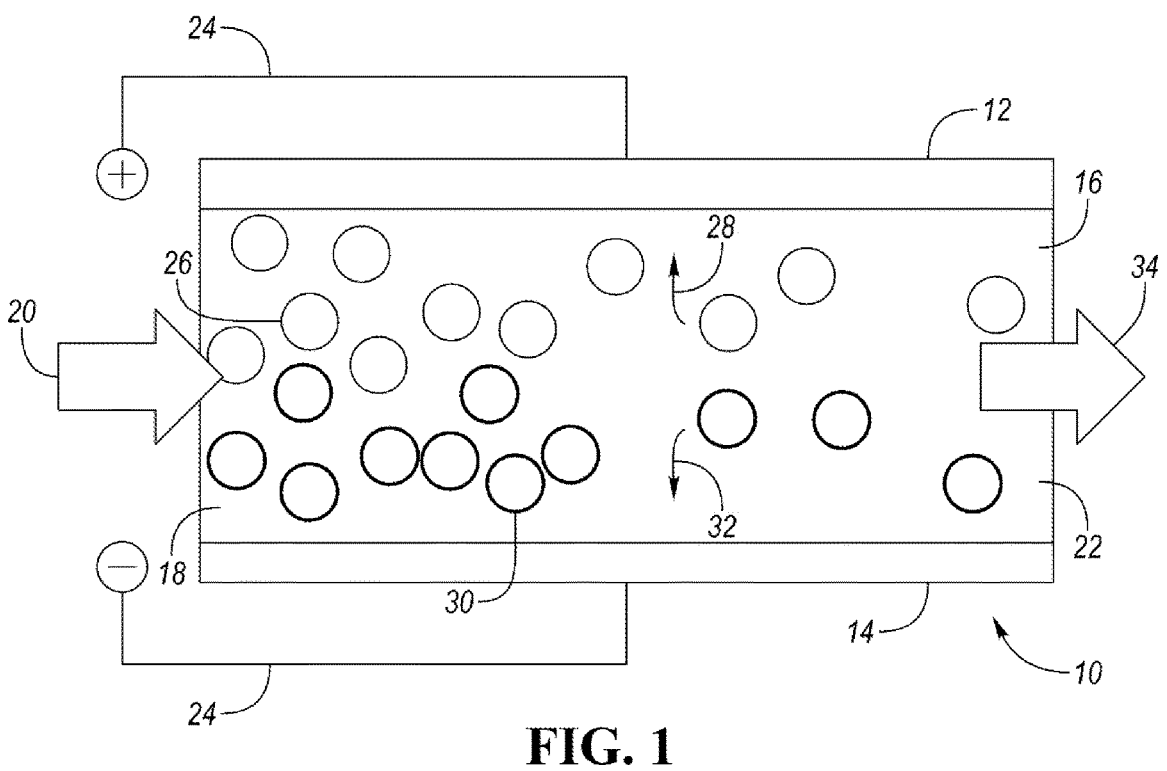
FIG. 1 depicts a schematic diagram of a capacitive deionization (CDI) system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. These terms may be used to modify any numeric value disclosed or claimed herein. Generally, the term "about" denoting a certain value is intended to denote a range within ±5% of the value. As one example, the phrase "about 100" denotes a range of 100±5, i.e. the range from 95 to 105. Generally, when the term "about" is used, it can be expected that similar results or effects according to the invention can be obtained within a range of ±5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1 to 10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of" and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Water from traditionally safe sources such as municipal water sources or potable water from wells may nonetheless possess qualities that are less desirable to the water consumer. For instance, water from potable water sources can vary significantly with respect to taste, odor, turbidity, bacterial and/or viral contamination, heavy metal contamination, hardness, mineral deposits, and/or a combination of these water quality parameters. The quality parameter of water hardness relates to the concentration of calcium ions ($Ca^{2+}$) and/or magnesium ions ($Mg^{2+}$) present in a given volume of water. Calcium and/or magnesium exist in potable water in the form of salts, which are normally soluble in the form of sulfates, carbonates, bicarbonates, or chlorides. The soluble salts are often ionized so that the water contains a relatively high concentration of calcium ions and/or magnesium ions.

Water is typically classified according to hardness as "soft water" or "hard water." The harder the water, the greater the concentration of calcium and/or magnesium ions per volume. Hard water is typically undesirable because it can cause scale buildup in plumbing, fixtures, and appliances and may affect the performance these systems and devices. For instance, the heat from a hot water heater removes some calcium carbonate and magnesium carbonate from the water, resulting in scale buildup that can slow the heating process and increase energy usage. Cleaning agents used with hard water are often less effective. Clothes washed in hard water may become dingy and gray with time and feel harsh or scratchy. Glassware may become spotted as it dries. Films may be left on shower doors or curtains, walls, and tubs, and hair washed in hard water may look dull and not feel clean. The process of removing calcium ions and/or magnesium ions from hard water is commonly referred to as water softening.

Reverse osmosis and thermal distillation are two examples of systems for removing ions from a solution. While both systems are very effective in desalinating saline solutions having high salinity, such as seawater, these systems are associated with relatively high costs and energy consumption. The concentration of dissolved salts in a saline solution having high salinity may be one of the following values or in the range of any two of the following values: 30,000; 31,000; 32,000; 33,000; 34,000; 35,000; 36,000; 37,000; 38,000; 39,000; and 40,000 parts per million. Desalination of saline solutions having lower salinity, such as brackish water, may be accomplished by using electro-chemical desalination systems, such as electrodialysis systems or capacitive deionization systems. These systems may treat a saline solution by partial removal of one or more types of ions from a saline solution stream. The concentration of dissolved salts in a saline solution having lower salinity may be one of the following values or in a range of any two of the following values: 1, 500; 2,000; 3,000; 4,000; 5,000; 6,000; 7,000; 8,000; 9,000; 10,000; 11,000; 12,000; 13,000; 14,000; and 15,000 parts per million.

A more recent proposal for an electrochemical desalination system for desalinating a lower salinity solution, such as brackish water, uses a flow-through desalination battery cell configured to intercalate one or more types of ions into a host structure. This type of electrochemical desalination system may be referred to as intercalative water desalination (IDI) system. An IDI system may have one or more benefits over electro-adsorption-based electrochemical desalination systems, such as capacitive deionization (CDI) systems, which rely on high surface area electrodes. The surface area of the electrode may be any of the following values or in a range of any two of the following values: 400, 450, 500, 550, 600, 650, 700, 750, 800, 850, 900, 950, 1,000, 1,050 and 1,110 m²/g. For instance, electrodes of an IDI system generally have higher available capacities for desalination of lower salinity solutions. These higher available capacities may improve efficiency and/or lower wear on the electrodes. As another example, since IDI systems do not rely on high surface area electrodes to achieve relatively high capacity, IDI systems may be less susceptible to fouling than the electrodes in a typical CDI system. Also, intercalation compounds may selectively remove specific types of targeted ions from a solution stream, which is advantageous when the solution meets most but not all quality criteria for a given application.

CDI systems include carbon-based electrodes configured to adsorb ions. Activated carbon materials may be used as substrates to build up an electrochemical double layer when an electric potential is applied. A saline solution stream flowing between a pair of carbon-based electrodes can be desalinated by reducing the number of ions in the solution stream. Upon reversal of the potential between the pair of electrodes or by shorting the circuit creating the electric potential, adsorbed ions are configured to release into a brine solution having a high concentration of dissolved salts through ion desorption.

FIG. 1 depicts a schematic diagram of capacitive deionization (CDI) system 10. CDI system 10 includes first carbon-based electrode 12, second carbon-based electrode 14, and compartment 16 extending therebetween. First and/or second carbon-based electrodes 12 and 14 may be formed of active carbon, mesoporous carbon, hierarchically porous carbon, carbon nanotubes, graphene, carbon aerogel, and combinations thereof. Channel 16 includes inlet 18 configured to inlet a saline solution, as depicted by arrow 20. The saline solution may be brackish water or seawater. Force is applied to the saline solution so that it flows from inlet 18 to outlet 22 through compartment 16. The force may be applied by a pump.

As shown in FIG. 1, a power source through circuit 24 applies a current to generate a potential between first carbon-based electrode 12 and second carbon-based electrode 14 such that first carbon-based electrode 12 has a positive charge and second carbon-based electrode 14 has a negative charge. As the saline solution flows through compartment 16, anions 26 (e.g., Cl⁻) are attracted to and adsorbed on first carbon-based electrode 12 as depicted by arrow 28 and cations 30 (e.g., Na⁺) are attracted to and adsorbed on second carbon-based electrode 14 as depicted by arrow 32. First and/or second carbon-based electrodes 12 and 14 may have a high-surface area to maximize the number of ions that are adsorbed. The surface area of the electrode may be any of the following values or in a range of any two of the following values: 400, 450, 500, 550, 600, 650, 700, 750, 800, 850, 900, 950, 1,000, 1,050 and 1,110 m²/g. By the time that the saline solution exits from outlet 22, the salinity of the solution is greatly reduced such that a fresh solution exits outlet 22 as depicted by arrow 34. The fresh solution may be a desalinated freshwater solution created from brackish water. Upon a polarity switch to circuit 24, adsorbed ion species are released back into the stream of the salinity solution, thereby creating a highly concentrated brine solution.

Figure 2A:
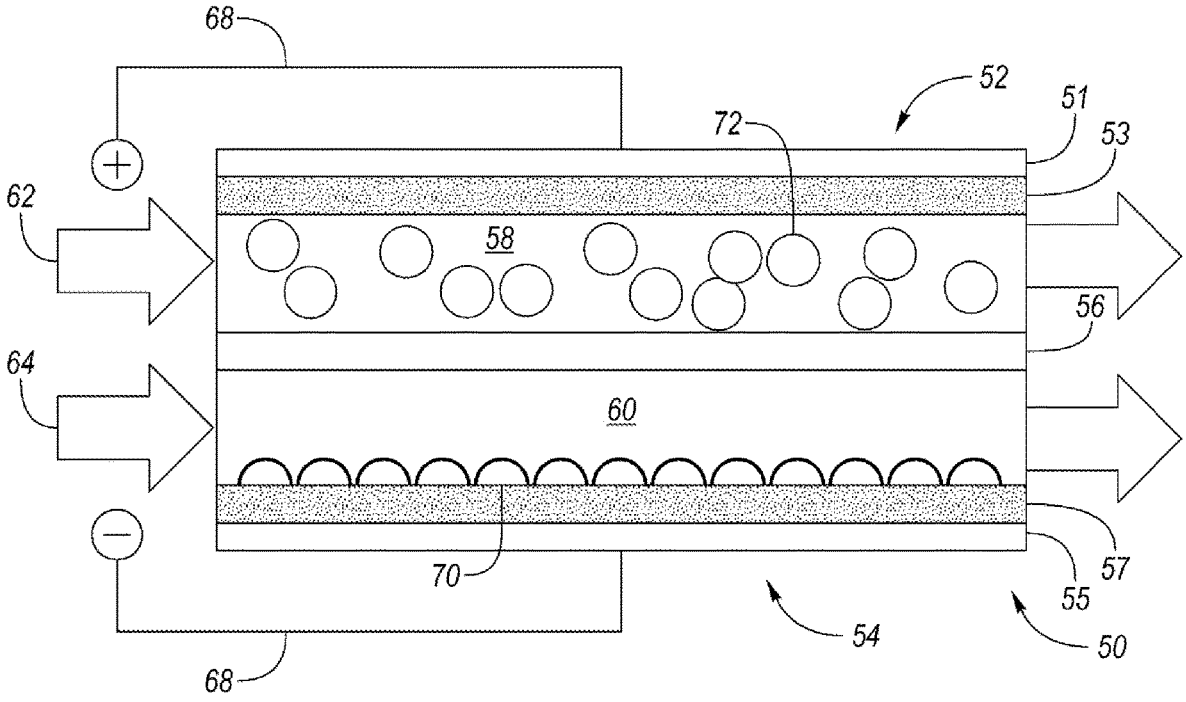
FIGS. 2a and 2b depict a schematic diagram of an intercalative desalination (IDI) system.
Figure 2B:
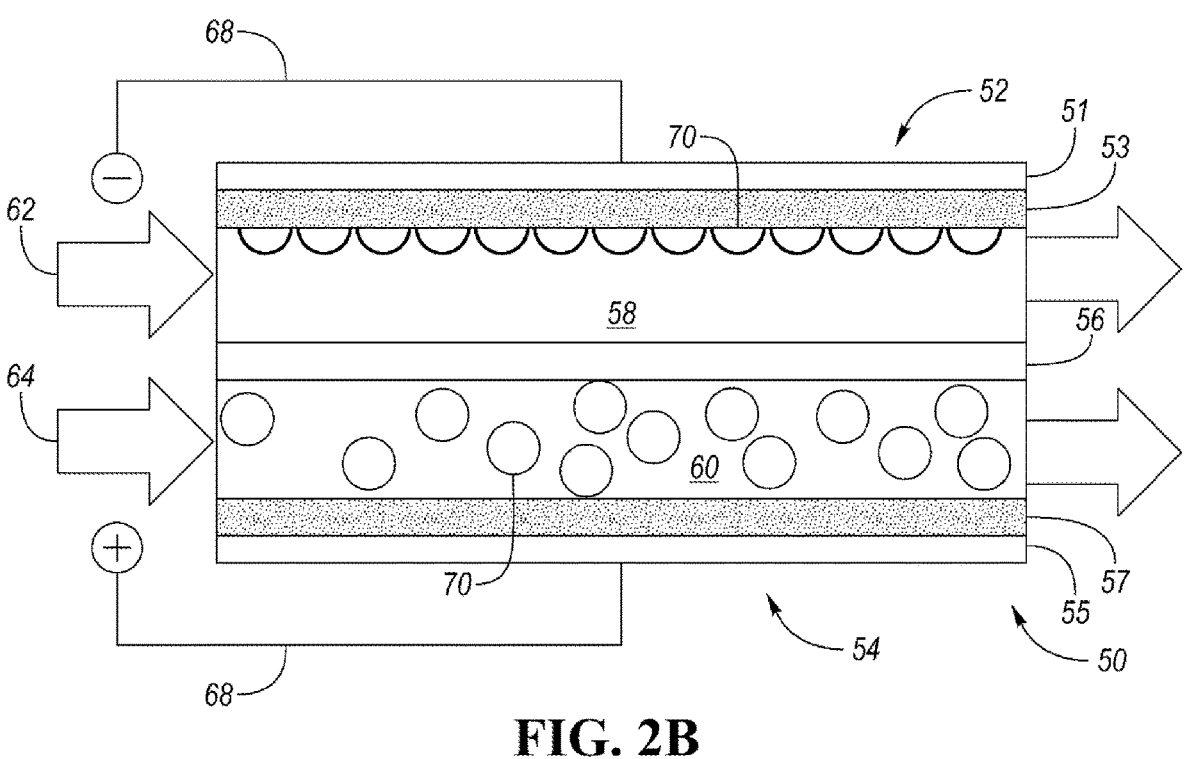

An IDI system may be configured to simultaneously process of first and second saline solutions streams, such as first and second brackish water streams, to produce a diluted solution stream and a concentrated solution stream. FIGS. 2A and 2B depict a schematic diagram of IDI system 50. An IDI system includes first and second intercalation electrodes. First and second intercalation hosts 53 and 57 may operate in a substantially filled state or a substantially empty state. In the substantially filled state, the intercalation host is substantially filled with cations (e.g., Na⁺). In the substantially empty state, the intercalation host is substantially empty of cations. In one or more embodiments, first and second intercalation hosts 53 and 57 may be partially filled at an initial state. For example, first and/or second intercalation hosts 53 and/or 57 may be at a 50% state of charge (e.g. 50% of the capacity is filled with cations).

First and second intercalation electrodes 52 and 54 are separated by anion exchange membrane 56. As a potential is applied to the first and second intercalation electrodes, cations from the substantially filled side are desorbed to create a brine solution stream, while cations in the adjacent compartment including the substantially empty electrode are removed from the feed solution by intercalating into the substantially empty electrode.

First intercalation electrode 52 includes first substrate 51 and first intercalation host 53 is applied to first substrate 51. Second intercalation electrode 54 includes second substrate 55 and second intercalation host 57 applied to second substrate 55. In one or more embodiments, an ion-selective membrane or an anion exchange member is placed between the surface of first and/or second intercalation electrodes 52 and 54 and the saline solution. This configuration permits released cations to recombine with anions from the opposite cell compartment. A water-permeable separator (not shown) may be used to prevent electrical contact between the first and second intercalation electrodes 52 and 54.

First compartment 58 is formed between first intercalation electrode 52 and anion exchange membrane 56. Second compartment 60 is formed between second intercalation electrode 54 and anion exchange membrane 56. As depicted by arrow 62, a first saline solution is fed into first compartment 58. As depicted by arrow 64, a second saline solution is fed into second compartment 60. The first and/or second saline solutions may be brackish water.

First and second intercalation electrodes 52 and 54 each have a state of charge (SOC) that changes continuously during operation. For example, first intercalation electrode 52 may start at 100% SOC and second intercalation electrode 54 at 0% SOC. As system 50 is operated, the SOC of first intercalation electrode 52 drops from 100% to 0% while the SOC of second intercalation electrode 54 rises from 0% to 100%. At the end of this "half cycle," the current (or voltage) is flipped and the cell runs in reverse, while being coordinated with the switching of valves, at least at the final outlets of system 50, such that the waste (brine) and purified streams continue to be provided as needed in system 50.

FIG. 2A depicts a first half-cycle operation of IDI system 50 and FIG. 2B depicts a second half-cycle operation of IDI system 50. At the beginning of the first half-cycle operation, first intercalation electrode 52 is substantially empty and second intercalation electrode 54 is substantially full. During the first half-cycle operation, a power source through circuit 68 applies a current to generate an electric potential between first intercalation electrode 52 and second intercalation electrode 54 such that first intercalation electrode 52 has a positive charge and second intercalation electrode 54 has a negative charge. FIG. 2A shows a state in which cations 70 were released from first intercalation electrode 52 into first compartment 58, while cations 70 in second compartment 60 were intercalated into second intercalation electrode 54. During each half-cycle operation, anions 72 cross anion exchange membrane 56 to recombine with cations 70 released from one of first and second intercalation electrodes 52 and 54. IDI system 50 is configured to supply a continuous stream of freshwater. When a saline solution (e.g., brackish water) is flowed through IDI system 50 and a current is applied by a power source through circuit 68, $Ca^{2+}$ and/or $Mg^{2+}$ ions are intercalated into first or second intercalation hosts 53 or 57, and anions (e.g., $Cl^-$ and $CO_3^{2-}$) are accumulated in the opposite first or second compartment 58 or 60 by transporting through anion exchange membrane 56. The outlet solution from one of first or second compartment 58 or 60 is softened (e.g., contains a lower concentration of $Ca^{2+}$ and/or $Mg^{2+}$) while the other of first and second compartment 58 and 60 is enriched in salinity and is considered a wastewater stream.

The usage of intercalation electrodes in IDI systems has been limited by the poor availability of materials that (a) intercalate only ions of relevance, most notably $Na^+$, (b) have sufficient capacities in the potential window provided by aqueous electrolyte, and (c) are non-toxic, and/or (b) have appropriate cycle life to purify a reasonable amount of water. With the increasing interest and application of sodium-ion batteries for energy-storage applications, significant progress has been made on sodium-ion intercalating cathode materials. The resulting materials also present a great potential for the application to the space of IDI systems. However, the utilization of this technology to municipal water desalination applications of brackish water is still limited because municipal water contains greater than optimal concentrations of $Ca^{2+}$ and $Mg^{2+}$ ions and a variety of materials configured to intercalate divalent ions is not known. The greater than optimal concentrations of divalent ions may be any of the following values or in a range of any two of the following values: 170, 175, 180, 185, 190, 195, 200, 205, 210, 215, 220, 225, and 230 parts per million. Selective ion extraction via an IDI system may be the most energy efficient in an area of municipal hard water desalination with these levels of divalent ions. Accordingly, there is a need for intercalation hosts suitable for water softening, including the removal of divalent cations, such as $Ca^{2+}$ and $Mg^{2+}$, where the intercalation hosts have a relatively long lifetime, low voltage, reasonable capacity, and/or non-toxic and are highly selective for the intercalation of divalent cations.

Systems for softening municipal water using $Ca^{2+}$ and $Mg^{2+}$ intercalation hosts and their limitations have not been adequately investigated. Current water softening systems primarily rely on ion-exchange membrane systems. One or more benefits of using intercalation hosts over ion-exchange systems include, without limitation, (1) intercalation hosts do not require use and replacement of a consumable reagent, such as NaOH or NaCl, and (2) ion-exchange systems may add a salt burden to waste streams that can be difficult to treat (and therefore, some municipalities have banned their use).

In light of the foregoing, one or more embodiments disclose binary and ternary intercalation materials suitable for use as intercalation hosts in a water softening system. In one or more embodiments, the intercalation material includes a binary transition metal Prussian blue analogue where the transition metal is nickel and/or copper for example.

In one embodiment, a water-softening device includes one or more electrodes including an intercalation host compound. The intercalation host compound may be a binary transition metal Prussian blue analogue having the following general formula: $A_xB_yC_z[Fe(CN)_6]$, where A=Li, Na, or K; B=Mn, Fe, Ni, Cu, or Zn; C=Mn, Fe, Ni, Cu, or Zn; $0 \le x \le 1$; $0 \le y \le 1$; and $0 \le z \le 1$. Examples of binary transition metal Prussian blue analogues include, but are not limited to, $A_xNi_yNi_z[Fe(CN)_6]$, $A_xCu_yNi_z[Fe(CN)_6]$, $A_xMn_yNi_z[Fe(CN)_6]$, $A_xFe_yNi_z[Fe(CN)_6]$, $A_xZn_yNi_z[Fe(CN)_6]$, $A_xCu_yCu_z[Fe(CN)_6]$, $A_xMn_yCu_z[Fe(CN)_6]$, $A_xFe_yCu_z[Fe(CN)_6]$, $A_xZn_yCu_z[Fe(CN)_6]$, $A_xMn_yMn_z[Fe(CN)_6]$, $A_xFe_yMn_z[Fe(CN)_6]$, $A_xZn_yMn_z[Fe(CN)_6]$, $A_xFe_yFe_z[Fe(CN)_6]$, $A_xZn_yFe_z[Fe(CN)_6]$, and $A_xZn_yZn_z[Fe(CN)_6]$, where A=Li, Na, or K; $0 \le x \le 1$; $0 \le y \le 1$; and $0 \le z \le 1$. The intercalation host compound may be a ternary transition metal Prussian blue analogue having the following general formula: $A_xB_yC_zD_w[Fe(CN)_6]$, where A=Li, Na, or K; B=Mn, Fe, Ni, Cu, or Zn; C=Mn, Fe, Ni, Cu, or Zn; D=Mn, Fe, Ni, Cu, or Zn; $0 \le x \le 1$; $0 \le y \le 1$; $0 \le z \le 1$; $0 \le w \le 1$.

In one embodiment, the intercalation electrode may be comprised of a mixture of an intercalation compound, a carbon additive, and a polymeric binder. The carbon additive is configured to provide electrical conductivity. The weight percent of the intercalation compound in the intercalation electrode may be any of the following values or in a range of any two of the following values: 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and 90 weight percent. The weight percent of the carbon additive in the intercalation electrode may be any of the following values or in a range of any two of the following values: 3, 4, 5, 6, 7, 8, 9, and 10 weight percent. The weight percent of the polymeric binder in the intercalation electrode may be any of the following values or in a range of any two of the following values: 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, and 35 weight percent. The polymeric binder may be polyvinylidene difluoride (PVDF).

The intercalation compound, carbon additive, and polymeric binder can be mixed to form a slurry in a solvent. The slurry can be applied to a substrate to form the intercalation electrode. The substrate may be formed of metal, carbon cloth, or graphene sheets. The application process may include blade-casting, roll casting, and/or airbrushing.

In one embodiment, the intercalation electrode may be used as first and/or second intercalation electrodes 52 and/or 54 as shown in FIGS. 2A and 2B. When a saline solution (e.g., brackish water) is flowed through IDI system 50 and a current is applied by a power source through circuit 68, $Ca^{2+}$ and/or $Mg^{2+}$ ions are intercalated into first or second intercalation hosts 53 or 57, and anions (e.g., $Cl^-$ and $CO_3^{2-}$) are accumulated in the opposite first or second compartment 58 or 60 by transporting through anion exchange membrane 56. The outlet solution from one of first or second compartment 58 or 60 is softened (e.g., contains a lower concentration of $Ca^{2+}$ and/or $Mg^{2+}$) while the other of first and second compartment 58 and 60 is enriched in salinity and is considered a wastewater stream. When the polarity of first and second intercalation electrodes 52 and 54 are switched by switching the direction of the current through circuit 68, intercalated ions are released back into the wastewater stream along with anions that cross anion exchange membrane 56 on the opposing side in which cations are now intercalating.

Figure 3:
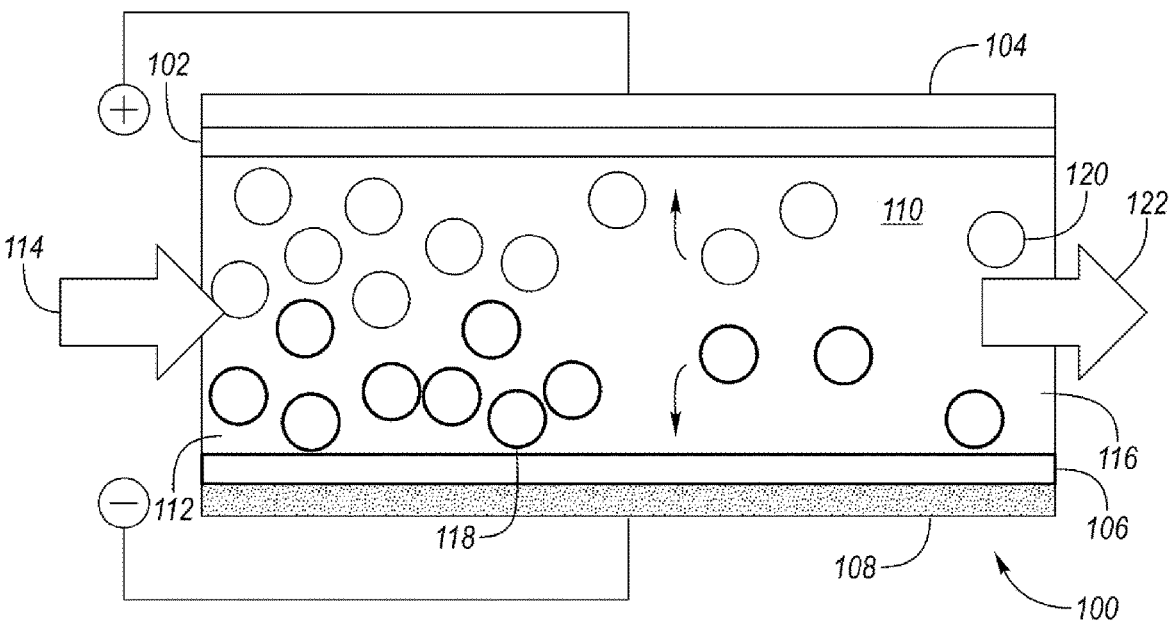
FIG. 3 depicts a schematic diagram of an example of a hybrid electrochemical desalination system.

In one or more embodiments, an intercalation electrode is paired with a high surface-area carbon counter-electrode. In one or more embodiments, ion-selective membranes are placed between the electrode surface and the solution to improve co-ion adsorption. FIG. 3 depicts a schematic diagram of hybrid electrochemical desalination system 100. Hybrid electrochemical desalination system 100 includes anion exchange membrane 102 in a layer-to-layer configuration with carbon-based electrode 104. Anion exchange membrane 102 may contact carbon-based electrode 104. Hybrid electrochemical desalination system 100 includes cation exchange membrane 106 in a layer-to-layer configuration with intercalation host 108. Cation exchange membrane 106 may contact intercalation host 108. Compartment 110 is formed between spaced apart anion exchange membrane 102 and cation exchange membrane 106. Hybrid electrochemical desalination system 100 may be configured to desalinate and soften a saline solution based on a combination of ion intercalation and electro-adsorption.

Compartment 110 includes inlet 112 configured to inlet a saline solution, as depicted by arrow 114. The saline solution may be brackish water or seawater. Force is applied to the saline solution so that it flows from inlet 112 to outlet 116 through compartment 110, as depicted by arrow 122. Cations 118 within the feed saline solution stream are removed through intercalation, while anions 120 are adsorbed on carbon-based electrode 104. Anion exchange membrane 102 is configured to increase efficiency by decreasing co-ion adsorption (e.g., co-ion adsorption on carbon-based electrode 104). The saline solution is only desalinated during one half-cycle due to the non-symmetric nature of hybrid electrochemical desalination system 100.

In another embodiment, one or more of the binary or ternary transition metal Prussian blue analogue intercalation host materials disclosed herein may be used in a first intercalation host of a first intercalation electrode. The other electrode may include or be formed of Ag/AgCl, BiOCl, or a combination thereof, or other materials configured to reversibly react with chloride ions. The other electrode may not include any of the binary or ternary transition metal Prussian blue analogue intercalation host materials disclosed herein. The other electrode may not include an intercalation host (e.g., hybrid electrochemical desalination system 100).

First and/or second intercalation hosts 53 and/or 57 may include a Prussian blue analogue. As disclosed in one or more embodiments, binary and ternary transition metal Prussian blue analogues may be used beneficially in IDI systems. These materials may have one or more of the following benefits: (1) relatively longer life cycles; (2) affinity toward intercalation of divalent ions; (3) capability to intercalate under higher current rates; and (4) more efficient during the intercalation process.

The Prussian blue analogues may be used in a combination of two or more IDI devices arranged sequentially to improve performance and/or salinity reduction rates. In one embodiment, a first IDI device is configured to predominantly remove monovalent ions such as $Na^+$ and a second IDI device is configured to predominantly remove divalent ions such as $Ca^{2+}$.

Figure 4:
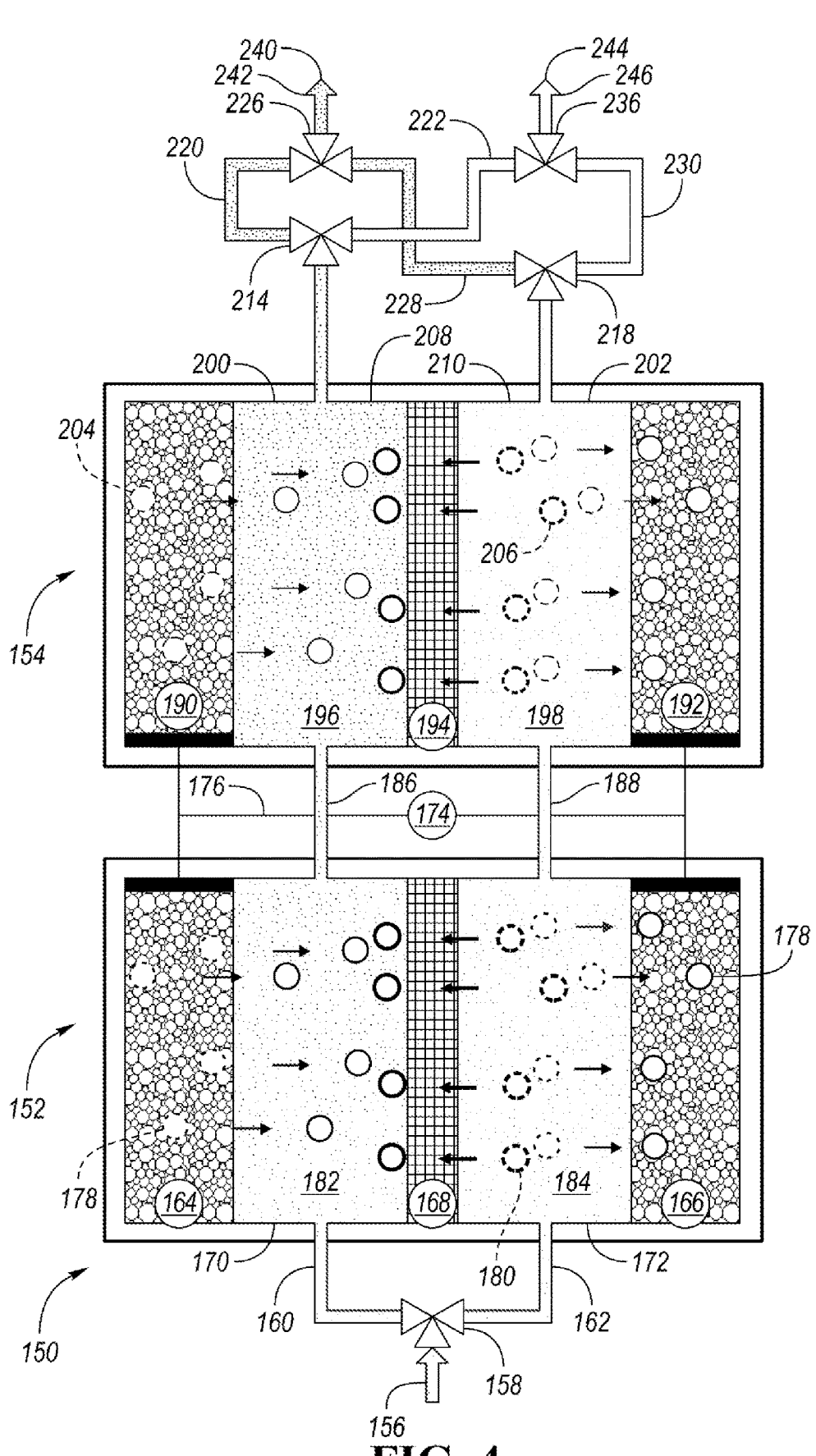
FIG. 4 depicts a schematic diagram of a sequential intercalative desalination (IDI) system.

FIG. 4 depicts sequential intercalative desalination (IDI) system 150 according to one embodiment. Sequential IDI system 150 includes upstream IDI device 152 and downstream IDI device 154. Inlet stream 156 of saline solution (e.g., seawater or brackish water) is fed into valve 158. Valve 158 is configured to create first and second streams 160 and 162, which are fed into upstream IDI device 152. Upstream IDI device 152 includes first and second intercalation hosts 164 and 166 and anion exchange membrane 168. First and/or second intercalation hosts 164 and/or 166 may be supported on first and/or second substrates, respectively. First compartment 170 is formed between first intercalation host 164 and anion exchange membrane 168. Second compartment 172 is formed between second intercalation host 166 and anion exchange membrane 168. First stream 160 flows through first compartment 170 and second stream 162 flows through second compartment 172.

First and second intercalation hosts 164 and 166 may operate in a substantially filled state, a partially filled state, or a substantially empty state. In the substantially filled state, the intercalation host is substantially filled with cations (e.g., $Na^+$). For instance, the percentage of the volumetric capacity of the intercalation host filled with cations in the substantially filled state may be any of the following values or in a range of any two of the following values: 90%, 91%, 92%, 93%, 94%, 95%, 96%, 97%, 98%, 99%, 99.5%, and 100%. In the partially filled state, the intercalation host is partially filled with cations. The percentage of the volumetric capacity of the intercalation host filled with cations in the partially filled state may be any of the following values or in arrange of any two of the following values: 40%, 41%, 42%, 43%, 44%, 45%, 46%, 47%, 48%, 49%, 50%, 51%, 52%, 53%, 54%, 55%, 56%, 57%, 58%, 59%, and 60%. In the substantially empty state, the intercalation host is substantially empty of cations. In the substantially empty state, the percentage of the volumetric capacity of the intercalation host filled with cations in the substantially empty state may be any of the following values or in arrange of any two of the following values: 0%, 0.1%, 0.5%, 1%, 2%, 3%, 4%, 5%, 6%, 7%, 8%, 9%, and 10%.

As shown in FIG. 4, first intercalation host 164 is substantially or partially filled with cations and second intercalation host 166 is substantially empty of cations. In one embodiment, the cations are monovalent cations (e.g., Na⁺). During operation of upstream IDI device 152, power source 174 applies current through circuit 176 to generate an electric potential between first intercalation host 164 and second intercalation host 166 such that first intercalation host 164 has a positive charge and second intercalation host 166 has a negative charge. As shown in FIG. 4, upstream cations 178 are released from first intercalation host 164 into first compartment 170 and other upstream cations 178 from second compartment 172 intercalate into second intercalation host 166, and upstream anions 180 (e.g., Cl⁻) migrate from second compartment 172 across anion exchange membrane 168 into first compartment 170, thereby forming upstream brine solution 182 in first compartment 170 and upstream fresh solution 184 in second compartment 172.

In one embodiment, first and/or second intercalation hosts 164 and/or 166 are configured to predominately intercalate monovalent ions. For instance, predominately may mean that the percentage of monovalent ions (e.g., monovalent cations such as Na⁺) intercalated to the total ions intercalated (e.g., total cations) based on total capacity of the intercalation host may be any of the following values or in a range of any two of the following values: 90%, 91%, 92%, 93%, 94%, 95%, 96%, 97%, 98%, 99%, 99.5%, 99.6%, 99.7%, 99.8%, 99.9%, and 100%.

Upstream brine solution 182 is configured to flow through first conduit 186 into downstream IDI device 154 and upstream fresh solution stream 184 is configured to flow through second conduit 188 into downstream IDI device 154. Downstream IDI device 154 includes first and second intercalation hosts 190 and 192 and anion exchange membrane 194. First and/or second intercalation hosts 190 and/or 192 may be supported on first and/or second substrates, respectively. First compartment 196 is formed between first intercalation host 190 and anion exchange membrane 194. Second compartment 198 is formed between second intercalation host 192 and anion exchange membrane 194. First stream 200 flows through first compartment 196 and second stream 202 flows through second compartment 198.

First and second intercalation hosts 190 and 192 may operate in a substantially filled state, a partially filled state, or a substantially empty state. In the substantially filled state, the intercalation host is substantially filled with cations. For instance, the percentage of the volumetric capacity of the intercalation host filled with cations in the substantially filled state may be any of the following values or in a range of any two of the following values: 90%, 91%, 92%, 93%, 94%, 95%, 96%, 97%, 98%, 99%, 99.5%, and 100%. In the partially filled state, the intercalation host is partially filled with cations. The percentage of the volumetric capacity of the intercalation host filled with cations in the partially filled state may be any of the following values or in arrange of any two of the following values: 40%, 41%, 42%, 43%, 44%, 45%, 46%, 47%, 48%, 49%, 50%, 51%, 52%, 53%, 54%, 55%, 56%, 57%, 58%, 59%, and 60%. In the substantially empty state, the intercalation host is substantially empty of cations. In the substantially empty state, the percentage of the volumetric capacity of the intercalation host filled with cations in the substantially empty state may be any of the following values or in arrange of any two of the following values: 0%, 0.1%, 0.5%, 1%, 2%, 3%, 4%, 5%, 6%, 7%, 8%, 9%, and 10%.

As shown in FIG. 4, first intercalation host 190 is substantially or partially filled with cations and second intercalation host 192 is substantially empty of cations. In one embodiment, the cations are divalent cations (e.g. Ca²⁺). During operation of downstream IDI device 154, power source 174 applies current through circuit 176 to generate an electric potential between first intercalation host 190 and second intercalation host 192 such that first intercalation host 190 has a positive charge and second intercalation host 192 has a negative charge. As shown in FIG. 4, downstream cations 204 are released from first intercalation host 190 and other downstream cations 204 from second compartment 198 intercalate into second intercalation host 192, and downstream anions 206 (e.g., CO₃²⁻ and/or Cl⁻) migrate from second compartment 198 across anion exchange membrane 194 into first compartment 196, thereby forming downstream brine solution 208 in first compartment 196 and downstream fresh solution stream 210 in second compartment 198. Downstream brine solution 208 may have a greater salinity than upstream brine solution 182. Downstream fresh solution stream 210 may have a lower salinity than upstream fresh solution stream 184.

In one embodiment, first and/or second intercalation hosts 190 and/or 192 are configured to predominately intercalate divalent ions. For instance, predominately may mean that the percentage of divalent ions (e.g., divalent cations such as Ca²⁺ and/or Mg²⁺) intercalated to the total ions intercalated (e.g., total cations) based on total capacity of the intercalation host may be any of the following values or in a range of any two of the following values: 50%, 55%, 60%, 65%, 70%, 75%, 80%, 85%, 90%, 91%, 92%, 93%, 94%, 95%, 96%, 97%, 98%, 99%, 99.5%, 99.6%, 99.7%, 99.8%, 99.9%, and 100%.

Downstream brine solution 208 is configured to flow into valve 214 and downstream fresh solution 210 is configured to flow into valve 218. Valve 214 may be configured to separate downstream brine solution 208 into brine solution stream 220 and fresh solution stream 222. Brine solution stream 220 flows into valve 226. Valve 218 may be configured to separate downstream fresh solution 210 into brine solution stream 228 and fresh solution stream 230. Brine solution stream 228 flows valve 226. Fresh solution stream 230 flows into valve 236. Fresh solution stream 222 flows into valve 236. Brine solution stream 240 exits valve 226 through conduit 242. Fresh solution stream 244 exits valve 236 through conduit 246.

As shown in FIG. 4, upstream IDI device 152 is optimized for removal of monovalent cations and downstream IDI device 154 is optimized for removal of divalent cations. In another embodiment, the upstream IDI device may be optimized for removal of divalent cations and the downstream IDI device may be optimized for removal of monovalent cations. Optimization of removal of different types of cations may be accomplished by varying the host material, thickness, porosity, and/or tortuosity between intercalation hosts.

While FIG. 4 depicts two IDI devices (i.e., upstream IDI device 152 and downstream IDI device 154), in other embodiments more than two sequential IDI devices may be utilized to further optimizing the removal of certain types of cations. For example, first, second, third, and fourth sequential IDI devices can be utilized such that the first IDI device is furthest upstream and the fourth IDI device is furthest downstream. Each of the first, second, third, and fourth sequential IDI devices may or may not be optimized to predominantly remove a different type of cation (e.g., Na⁺, K⁺, Ca²⁺, and Mg²⁺), two or more IDI compartments may be put in a series to increase the amount of salt removed.

Figure 5:
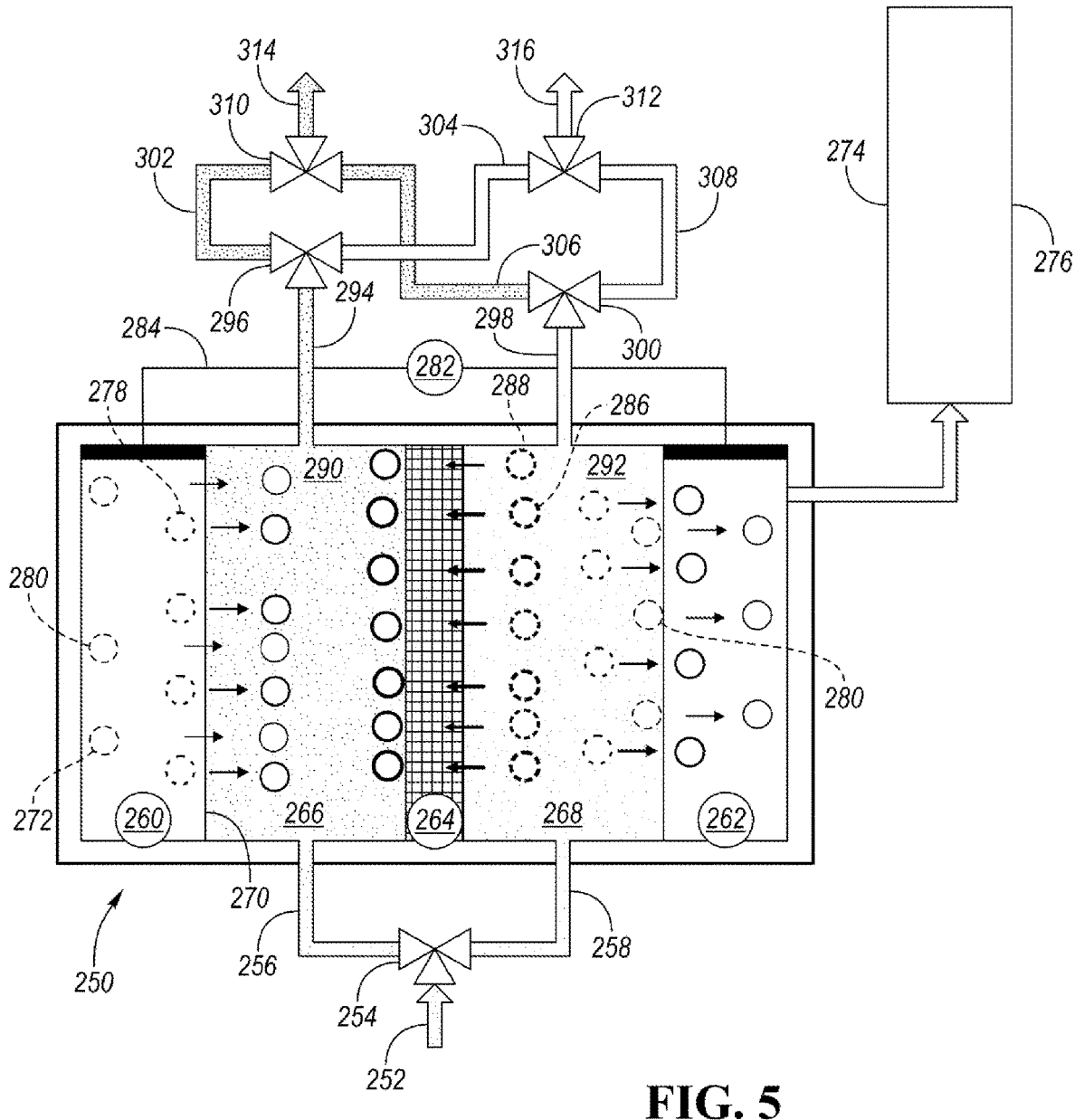
FIG. 5 depicts a schematic diagram of an IDI device having intercalation hosts including a gradient including two or more host materials.

FIG. 5 depicts intercalative desalination (IDI) system 250 according to one embodiment. Inlet stream 252 of saline solution (e.g., seawater or brackish water) is fed into valve 254. Valve 254 is configured to create first and second streams 256 and 258, which are fed into IDI system 250. IDI system 250 includes first and second intercalation hosts 260 and 262 and anion exchange membrane 264. First and/or second intercalation hosts 260 and/or 262 may be supported on first and/or second substrates, respectively. First compartment 266 is formed between second intercalation host 262 and anion exchange membrane 264. Second compartment 268 is formed between second intercalation host 262 and anion exchange membrane 264. First stream 256 flows through first compartment 266 and second stream 258 flows through second compartment 268.

First and second intercalation hosts 260 and 262 may operate in a substantially filled state, a partially filled state, or a substantially empty state. In the substantially filled state, the intercalation host is substantially filled with cations (e.g., $Na^+$). For instance, the percentage of the volumetric capacity of the intercalation host filled with cations in the substantially filled state may be any of the following values or in a range of any two of the following values: 90%, 91%, 92%, 93%, 94%, 95%, 96%, 97%, 98%, 99%, 99.5%, and 100%. In the partially filled state, the intercalation host is partially filled with cations. The percentage of the volumetric capacity of the intercalation host filled with cations in the partially filled state may be any of the following values or in arrange of any two of the following values: 40%, 41%, 42%, 43%, 44%, 45%, 46%, 47%, 48%, 49%, 50%, 51%, 52%, 53%, 54%, 55%, 56%, 57%, 58%, 59%, and 60%. In the substantially empty state, the intercalation host is substantially empty of cations. In the substantially empty state, the percentage of the volumetric capacity of the intercalation host filled with cations in the substantially empty state may be any of the following values or in arrange of any two of the following values: 0%, 0.1%, 0.5%, 1%, 2%, 3%, 4%, 5%, 6%, 7%, 8%, 9%, and 10%.

One or both of first and second intercalation hosts 260 and 262 may have a host material gradient formed of two or more host materials. For instance, the concentration of host material in first and/or second intercalation hosts 260 and/or 262 may increase or decrease through the thickness of first and/or second intercalation hosts 260 and/or 262 toward first and/or second compartment 266 and/or 268. In one or more embodiments, the increase or decrease in the concentration may be linear, nonlinear, exponential, constant, stepwise, or a combination thereof.

First intercalation host 260 includes first surface 270 adjacent to first compartment 266 and second surface 272 opposing first surface 270. Second intercalation host 262 includes first surface 274 adjacent to second compartment 268 and second surface 276 opposing first surface 274. One or more layers closer to first surface 274 than second surface 276 are formed from a first host material configured to predominately intercalate monovalent cations. One or more layers closer to second surface 276 than first surface 274 are formed from a second host material configured to predominately intercalate divalent cations. The innermost layers of the first and second host materials may contact each other. This layering structure may also be applied to first intercalation host 260. The total thickness of the one or more layers formed from the first host material may be half the total thickness of the intercalation host measured between the first and second surfaces. The total thickness of the one or more layers formed from the second host material may be half the total thickness of the intercalation host. Each of the layers may have a gradient in the concentration of host material. The ratio of the total thickness of the one or more layers formed from the first host material to the total thickness of the one or more layers formed from the second host material may be any of the following values or in a range of any two of the following values: 3:1, 2.5:1, 2:1, 1.5:1, 1:1, 1:1.5, 1:2, 1:2.5, and 1:3. In another embodiment, the first host material is configured to predominantly remove divalent cations and the second host material is configured to predominantly remove monovalent cations.

As shown in FIG. 5, first intercalation host 260 is substantially or partially filled with cations and second intercalation host 262 is substantially empty of cations. In one embodiment, first intercalation host 260 includes monovalent cations 278 intercalated into the one or more layers of the first host material and divalent cations 280 intercalated into the one or more layers of the second host material. During operation of IDI system 250, power source 282 applied current through circuit 284 to generate an electric potential between first intercalation host 260 and second intercalation host 262 such that first intercalation host 260 has a positive charge and second intercalation host 262 has a negative charge. As shown in FIG. 5, monovalent and divalent cations 278 and 280 are released from first intercalation host 260 into first compartment 266 and monovalent and divalent cations 278 and 280 from second compartment 268 intercalate into second intercalation host 262, and monovalent and divalent anions 286 and 288 migrate from second compartment 268 across anion exchange membrane 264 into first compartment 266, thereby forming brine solution 290 in first compartment 266 and fresh solution 292 in second compartment 268.

Brine solution 290 is configured to flow through conduit 294 into valve 296 and fresh solution 292 is configured to flow through conduit 298 into valve 300. Valve 296 may be configured to separate brine solution 290 into brine solution stream 302 and fresh solution stream 304. Brine solution stream 302 flows into valve 310. Valve 300 may be configured to separate fresh solution 292 into brine solution stream 306 and fresh solution stream 308. Brine solution stream 306 flows into valve 310. Fresh solution stream 308 flows into valve 312. Fresh solution stream 304 flows into valve 312. Brine solution stream 314 exits valve 310. Fresh solution steam 316 exits valve 312.

As shown in FIG. 5, the one or more layers closest to the surface of the intercalation host are configured to predominantly remove monovalent cations with a first host material and the one or more layers closest to the opposing surface are configured to predominantly remove divalent cations with a second host material. In another embodiment, the one or more layers closest to the surface of the intercalation host are configured to predominantly remove divalent cations with a first host material and the one or more layers closest to the opposing surface are configured to predominantly remove monovalent cations with a second host material. Optimization of removal of different types of cations may be accomplished by varying the thickness, porosity, and/or tortuosity within intercalation hosts.

While FIG. 5 depicts a single IDI device, in other embodiments more than one IDI device may be utilized to further optimize the remove of certain types of cations. For example, first and second IDI devices can be utilized such that the first IDI device is upstream, and the second IDI device is downstream. The first IDI device may be configured to have intercalation hosts of two or more layers (e.g., one or more layers of a first host material configured to predominantly intercalate a first cation and one or more layers of a second host material configured to predominantly intercalate a second cation). The second IDI device may be configured to have intercalation hosts of two or more layers (e.g., one or more layers of a third host material configured to predominantly intercalate a third cation and one or more layers of a fourth host material configured to predominantly intercalate a fourth cation).

Figure 6:
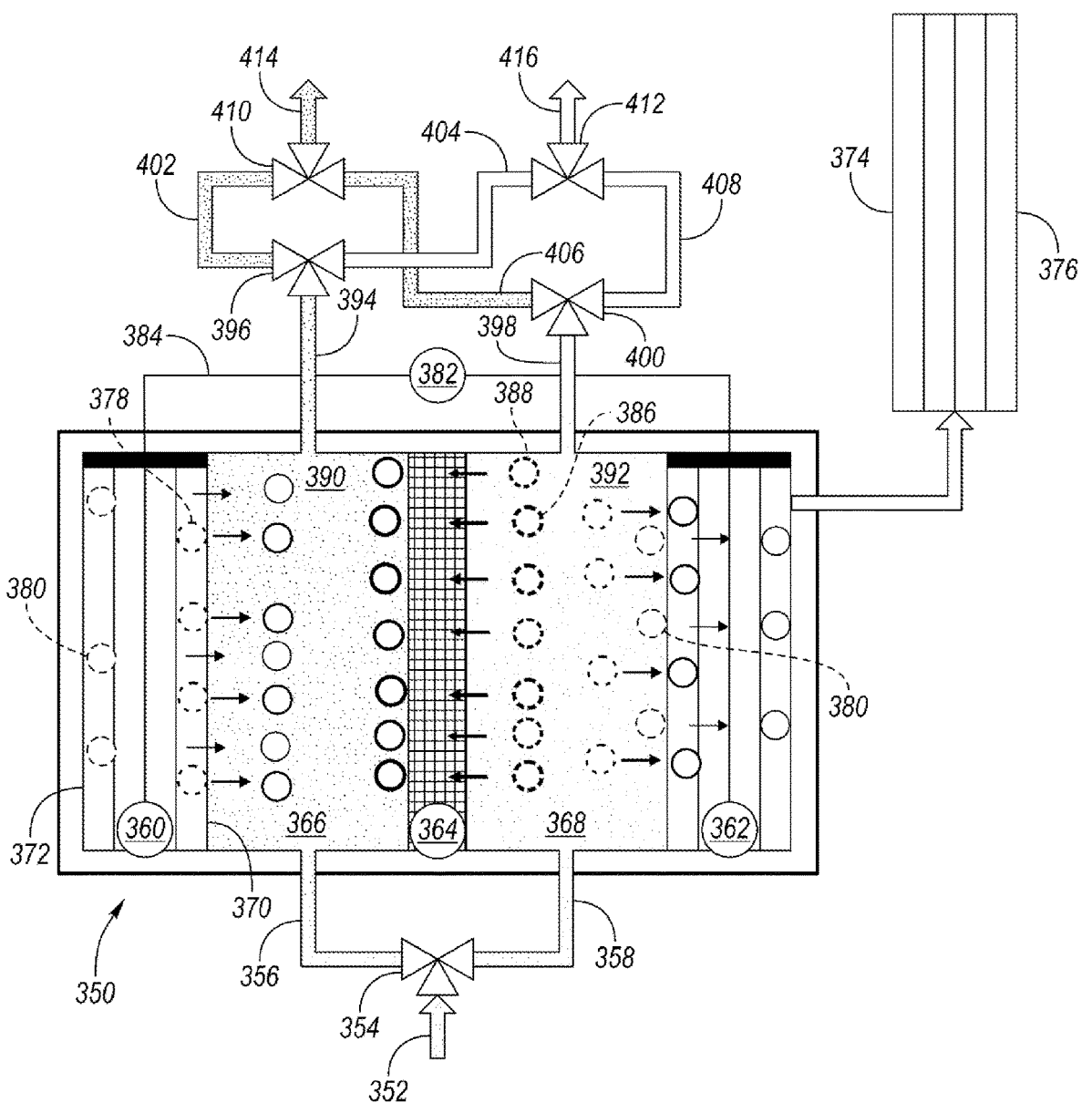
FIG. 6 depicts a schematic diagram of an IDI device having intercalation hosts including alternating layers of two or more host materials.

FIG. 6 depicts intercalative desalination (IDI) system 350 according to one embodiment. Inlet stream 352 of saline solution (e.g., seawater or brackish water) is fed into valve 354. Valve 354 is configured to create first and second streams 356 and 358, which are fed into IDI system 350. IDI system 350 includes first and second intercalation hosts 360 and 362 and anion exchange membrane 364. First and/or second intercalation hosts 360 and/or 362 may be supported on first and/or second substrates, respectively. First compartment 366 is formed between first intercalation host 360 and anion exchange membrane 364. Second compartment 368 is formed between second intercalation host 362 and anion exchange membrane 364. First stream 356 flows through first compartment 366 and second stream 358 flows through second compartment 368.

First and second intercalation hosts 360 and 362 may operate in a substantially filled state, a partially filled state, or a substantially empty state. In the substantially filled state, the intercalation host is substantially filled with cations. For instance, the percentage of the volumetric capacity of the intercalation host filled with cations in the substantially filled state may be any of the following values or in a range of any two of the following values: 90%, 91%, 92%, 93%, 94%, 95%, 96%, 97%, 98%, 99%, 99.5%, and 100%. In the partially filled state, the intercalation host is partially filled with cations. The percentage of the volumetric capacity of the intercalation host filled with cations in the partially filled state may be any of the following values or in arrange of any two of the following values: 40%, 41%, 42%, 43%, 44%, 45%, 46%, 47%, 48%, 49%, 50%, 51%, 52%, 53%, 54%, 55%, 56%, 57%, 58%, 59%, and 60%. In the substantially empty state, the intercalation host is substantially empty of cations. In the substantially empty state, the percentage of the volumetric capacity of the intercalation host filled with cations in the substantially empty state may be any of the following values or in arrange of any two of the following values: 0%, 0.1%, 0.5%, 1%, 2%, 3%, 4%, 5%, 6%, 7%, 8%, 9%, and 10%.

One or both of first and second intercalation hosts 360 and 362 may have two or more layers, where each of layers is formed of the same or different host material. As shown in FIG. 6, each of first and second intercalation hosts 360 and 362 have layers formed of alternating host materials. First intercalation host 360 includes first surface 370 adjacent to first compartment 366 and second surface 372 opposing first surface 370. First, second, third, and fourth layers extend between first and second surfaces 370 and 372 of first intercalation host 360. Second intercalation host 362 includes first surface 374 adjacent to second compartment 368 and second surface 376 opposing first surface 374. First, second, third, and fourth layers extend between first and second surfaces 374 and 376 of second intercalation host 362. In one embodiment, the first and third layers of first and/or second intercalation hosts 360 and/or 362 are formed from a first host material configured to predominately intercalate monovalent cations, and the second and fourth layers of the first and/or second intercalation hosts 360 and/or 362 are formed from a second host material configured to predominately intercalate divalent cations. The total thickness of each of the first, second, third, and fourth layers may be one fourth the total thickness of the intercalation host measured between the first and second surfaces. The total thickness of each of the layers may vary. In another embodiment, the first host material is configured to predominantly remove divalent cations and the second host material is configured to predominantly remove monovalent cations.

As shown in FIG. 6, first intercalation host 360 is substantial or partially filled with cations and second intercalation host 362 is substantially empty of cations. In one embodiment, first intercalation host 360 includes monovalent cations 378 intercalated into the one or more layers of the first host material and divalent cations 380 intercalated into the one or more layers of the second host material. During operation of IDI system 350, power source 382 applies current through circuit 384 to generate an electric potential between first intercalation host 360 and second intercalation host 362 such that first intercalation host 360 has a positive charge and second intercalation host 362 has a negative charge. As shown in FIG. 6, monovalent and divalent cations 378 and 380 are released from first intercalation host 360 into first compartment 366 and monovalent and divalent cations 378 and 380 from second compartment 368 intercalate into second intercalation host 362, and monovalent and divalent anions 386 and 388 migrate from second compartment 368 across anion exchange membrane 364 into first compartment 366, thereby forming brine solution 390 in first compartment 366 and fresh solution 392 in second compartment 368.

Brine solution 390 is configured to flow through conduit 394 into valve 396 and fresh solution 392 is configured to flow through conduit 398 into valve 400. Valve 396 may be configured to separate brine solution 390 into brine solution stream 402 and fresh solution stream 404. Brine solution stream 402 flows into valve 410. Valve 400 may be configured to separate fresh solution 392 into brine solution stream 406 and fresh solution stream 408. Brine solution stream 406 flows into valve 410. Fresh solution stream 408 flows into valve 412. Fresh solution stream 404 flows into valve 412. Brine solution stream 414 exits valve 410. Fresh solution steam 416 exits valve 412.

As shown in FIG. 6, alternating layers of first and second host materials are shown. In another embodiment, alternating layers of more than two host materials may be used. For example, alternating layers of first, second, third, and fourth host materials configured to predominantly intercalate first, second, third, and fourth types of cations (e.g., $Na^+$, $K^+$, $Ca^{2+}$, and $Mg^{2+}$). Optimization of removal of different types of cations may be accomplished by varying the thickness, porosity, and/or tortuosity within intercalation hosts.

While FIG. 6 depicts a single IDI device, in other embodiments more than one IDI device may be utilized to further optimize the remove of certain types of cations. For example, first and second IDI devices can be utilized such that the first IDI device is upstream, and the second IDI device is downstream. The first IDI device may be configured to have intercalation hosts of two or more alternating layers (e.g., one or more layers of a first host material configured to predominantly intercalate a first cation and one or more layers of a second host material configured to predominantly intercalate a second cation). The second IDI device may be configured to have intercalation hosts of two or more alternating layers (e.g., one or more layers of a third host material configured to predominantly intercalate a third cation and one or more layers of a fourth host material configured to predominantly intercalate a fourth cation).

Figure 7:
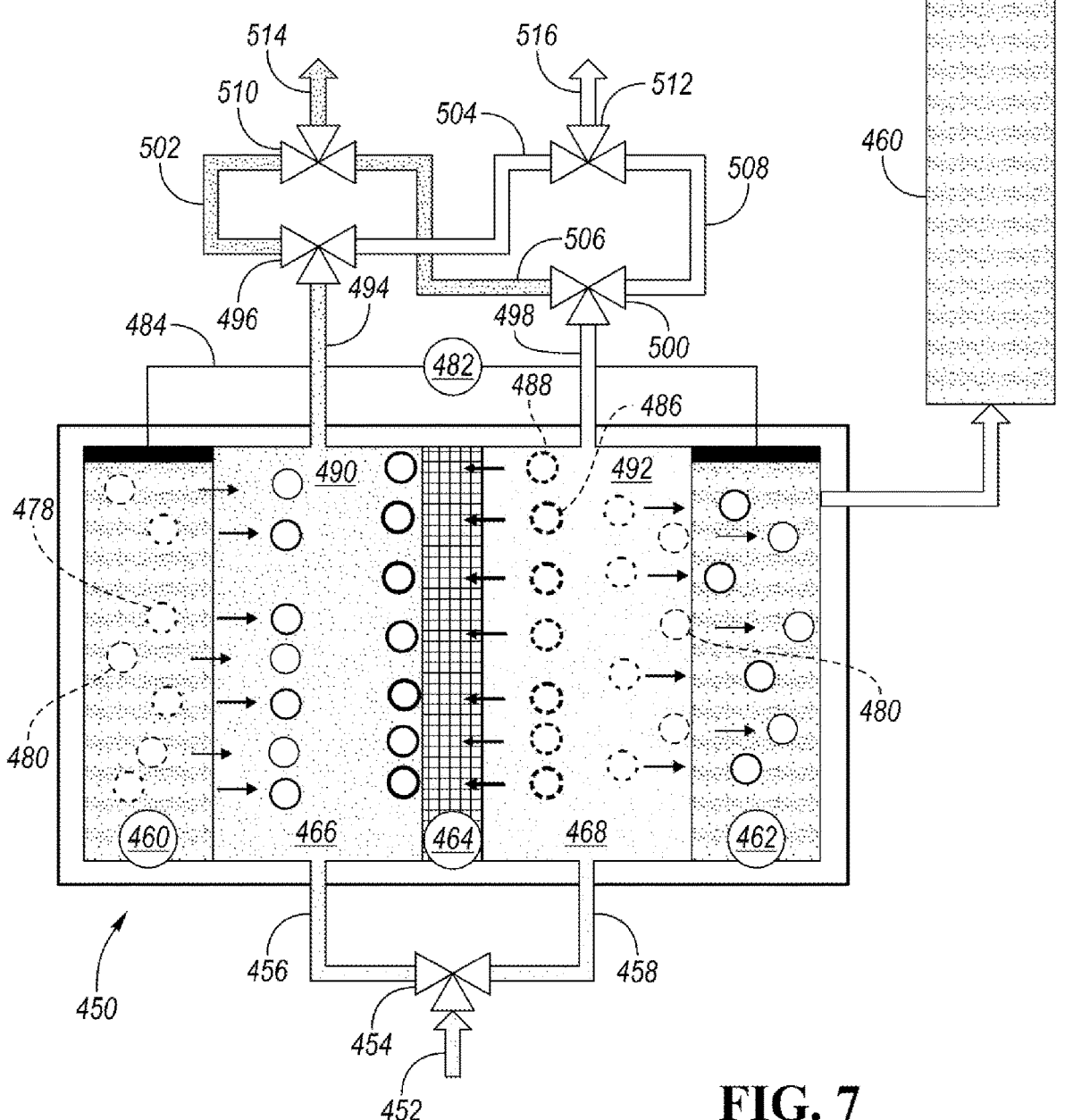
FIG. 7 depicts a schematic diagram of an IDI device having intercalation hosts including a mixture of two or more host materials.

FIG. 7 depicts intercalative desalination (IDI) system 450 according to one embodiment. Inlet stream 452 of saline solution (e.g., seawater or brackish water) is fed into valve 454. Valve 454 is configured to create first and second streams 456 and 458, which are fed into IDI system 450. IDI system 450 includes first and second intercalation hosts 460 and 462 and anion exchange membrane 464. First and/or second intercalation hosts 460 and/or 462 may be supported on first and/or second substrates, respectively. First compartment 466 is formed between first intercalation host 460 and anion exchange membrane 464. Second compartment 468 is formed between second intercalation host 462 and anion exchange membrane 464. First stream 456 flows through first compartment 466 and second stream 458 flows through second compartment 468.

One or both of first and second intercalation hosts 460 and 462 may be formed of a mixture or blend of two or more host materials. In one embodiment, the mixture of blend may be of two different host materials. The first host material may be configured to predominately intercalate monovalent cations. The second host material may be configured to predominately intercalate divalent cations. The mixture or blend may mixed or blended throughout the entire volume of first and/or second intercalation hosts 460 and/or 462. In other embodiments, the mixture of blend may occupy one or more layers of first and/or second intercalation hosts 460 and/or 462. The layers that are not occupied by the mixture or blend may be occupied by layers of the first or second host materials (or other types of host materials). The mixture or blend may be a homogenous mixture or blend. The mixture or blend may have the same amount of each of the types of host materials or may have different amounts of each of the types of host materials.

As shown in FIG. 7, first intercalation host 460 is substantially or partially filled with cations and second intercalation host 462 is substantially empty of cations. In one embodiment, first intercalation host 460 includes monovalent cations 478 intercalated into the mixture or blend of two or more host materials and divalent cations 480 intercalated into the mixture or blend of two or more host materials. During operation of IDI system 450, power source 482 applied current through circuit 484 to generate an electric potential between first intercalation host 460 and second intercalation host 462 such that first intercalation host 460 has a positive charge and second intercalation host 462 has a negative charge. As shown in FIG. 7, monovalent and divalent cations 478 and 480 are released from first intercalation host 460 into first compartment 466 and monovalent and divalent cations 478 and 480 from second compartment 468 intercalate into second intercalation host 462, and monovalent and divalent anions 486 and 488 migrate from second compartment 468 across anion exchange membrane 464 into first compartment 466, thereby forming brine solution 490 in first compartment 466 and fresh solution 492 in second compartment 468.

Brine solution 490 is configured to flow through conduit 494 into valve 496 and fresh solution 492 is configured to flow through conduit 498 into valve 500. Valve 496 may be configured to separate brine solution 490 into brine solution stream 502 and fresh solution stream 504. Brine solution stream 502 flows into valve 510. Valve 500 may be configured to separate fresh solution 492 into brine solution stream 506 and fresh solution stream 508. Brine solution stream 506 flows into valve 510. Fresh solution stream 508 flows into valve 512. Fresh solution stream 504 flows into valve 512. Brine solution stream 514 exits valve 510. Fresh solution steam 516 exits valve 512.

Each of first and second intercalation hosts 460 and 462 may be formed of a mixture or blend of two or more types of host materials to optimize monovalent or divalent intercalation for a specific application (e.g., industrial brackish water desalination, home appliance water hardness reduction, or water desalination for drinking water). The intercalation hosts of one or more embodiments (including the embodiments shown in FIGS. 5, 6, and 7) may include one or more structural enhancements such as carbon nanotubes or the intercalation material may be coated with carbon nanotubes.

One or more embodiments may be used to tailor the salt composition using one or more desalination devices. For instance, a first IDI device (or other desalination device) may remove or add a first cation (e.g., $Na^+$) to a target water stream, while a second IDI device may remove or add a second cation (e.g., $Ca^{2+}$) to the target water stream. The flow rates and/or current (or voltage) to each IDI device may be controlled independently to achieve a desired salt composition of the outlet target water stream (e.g., the outlet water stream simulates a flavor of mineral water). In one embodiment, an intercalation host with less selective cation intercalation may be employed in a first IDI device (or other desalination device), while a more selective intercalation host may be used in a second IDI device for targeting a desired composition with a relatively high precision.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A device for removing ions from a solution, the device comprising:
    first and second intercalation hosts;
    an anion exchange membrane;
    a first compartment extending between the first intercalation host and the anion exchange membrane; and
    a second compartment extending between the second intercalation host and the anion exchange membrane, the first intercalation host including a first surface adjacent to the first compartment and a second surface opposing the first surface, the second intercalation host including a first surface adjacent to the second compartment and a second surface opposing the first surface, a number of layers extending between the first and second surfaces of the first intercalation host, at least one of the number of layers including a first intercalation material, at least another of the number of layers including a second intercalation material, and the first and second intercalation materials are different, wherein the first intercalation material is configured to predominately intercalate a first type of cations and the second intercalation material is configured to predominantly intercalate a second type of cations.

2. The device of claim 1, wherein the at least one of the number of layers including the first intercalation material includes the first surface of the first intercalation host, and the at least another of the number of layers including the second intercalation material contacts the second surface of the first intercalation host.

3. The device of claim 1, wherein the number of layers extending between the first and second surfaces of the first intercalation host includes first, second, third, and fourth layers.

4. The device of claim 3, wherein the first, second, third, and fourth layers alternating between including the first intercalation material and the second intercalation material.

5. The device of claim 4, wherein the first or second intercalation material has a first or second intercalation material concentration gradient.

6. The device of claim 4, wherein the first, second, third, and fourth layers include first, second, third, and fourth intercalation materials configured to predominantly intercalate the first type of cation, the second type of cation, a third type of cation, and a fourth type of cation.

7. The device of claim 6, wherein the first, second, third, and fourth types of cations are different.

8. The device of claim 6, wherein the first, second, third, and fourth types of cations are individually selected from the group consisting of $Na^+$, $K^+$, $Ca^{2+}$, and $Mg^{2+}$.

9. The device of claim 1, wherein the first type of cations is monovalent cations or divalent cations, and the second type of cations is the other of monovalent cations and divalent cations.

10. The device of claim 1, wherein a percentage of the first type of cations intercalated to the total cations intercalated based on a total capacity of the first intercalation material is greater than 50%, and a second percentage of the second type of cations intercalated to the total cations intercalated based on a total capacity of the second intercalation material is greater than 50%.

11. The device of claim 1, wherein the first intercalation material is a first Prussian blue analogue compound, the second intercalation material is a second Prussian blue analogue compound, and the first Prussian blue analogue compound is different than the second Prussian blue analogue compound.

12. A device for removing ions from a solution, the device comprising:
  first and second intercalation hosts;
  an anion exchange membrane;
  a first compartment extending between the first intercalation host and the anion exchange membrane; and
  a second compartment extending between the second intercalation host and the anion exchange membrane, the first and/or second intercalation hosts including a mixture of first and second intercalation materials, the first and second intercalation materials are different, and the mixture has a different amount of the first and second intercalation materials wherein the first intercalation host includes first and second layers, and the mixture of first and second intercalation materials is disposed in the first or second layer.

13. The device of claim 12, wherein the first intercalation material is configured to predominately intercalate a first type of cations and the second intercalation material is configured to predominately intercalate a second type of cations.

14. The device of claim 13, wherein the first type of cations is monovalent cations or divalent cations, and the second type of cations is the other of monovalent cations and divalent cations.

15. The device of claim 13, wherein a percentage of the first type of cations intercalated to the total cations intercalated based on a total capacity of the first intercalation material is greater than 50%, and a second percentage of the second type of cations intercalated to the total cations intercalated based on a total capacity of the second intercalation material is greater than 50%.

16. The device of claim 13, wherein the first intercalation material is a first Prussian blue analogue compound, the second intercalation material is a second Prussian blue analogue compound, and the first Prussian blue analogue compound is different than the second Prussian blue analogue compound.

17. The device of claim 12, wherein the mixture of first and second intercalation materials is a homogenous mixture of first and second intercalation materials.

18. The device of claim 12, wherein the first and second intercalation materials are coated with carbon nanotubes.

19. The device of claim 12, wherein the mixture of first and second intercalation materials includes carbon nanotubes.

* * * * *